United States Patent [19]

Nakada et al.

[11] 4,016,702
[45] Apr. 12, 1977

[54] METHOD FOR MANUFACTURING A HEAT-INSULATING CLOSED STRUCTURE

[75] Inventors: Hiroshi Nakada; Yukio Kosuge, both of Tokyo, Japan

[73] Assignee: Showa Denko Kabushiki Kaisha, Tokyo, Japan

[22] Filed: Oct. 24, 1975

[21] Appl. No.: 625,379

[30] Foreign Application Priority Data

Oct. 29, 1974 Japan ........................... 49-123884
Aug. 13, 1975 Japan .............................. 50-97481

[52] U.S. Cl. ........................................ 52/743; 52/2
[51] Int. Cl.² ......................................... E04B 1/00
[58] Field of Search ................ 52/2, 404, 741, 743, 52/309; 264/45.2

[56] References Cited

UNITED STATES PATENTS

| | | | |
|---|---|---|---|
| 2,910,994 | 11/1959 | Joy | 52/2 |
| 3,257,481 | 6/1966 | Chang | 264/45.2 |
| 3,357,142 | 12/1967 | Furrer et al. | 52/2 |
| 3,500,596 | 3/1970 | Andersson | 52/404 X |

OTHER PUBLICATIONS

*Principles of Pneumatic Architecture*, Roger Dent, 1972, p. 125.

Primary Examiner—Price C. Faw, Jr.
Assistant Examiner—Carl D. Friedman
Attorney, Agent, or Firm—Oblon, Fisher, Spivak, McClelland & Maier

[57] ABSTRACT

A heat-insulating closed structure is disclosed which comprises an outer membrane formed of a gas-impervious substance, an inner membrane formed of a gas-pervious substance, a foamed member produced to fill the space between said outer membrane and inner membrane and a floor member made of a heat-insulating substance and adapted to allow the composite membrane unit formed of said two membranes and said intervening foamed member to be supported in position thereon. This structure is manufactured by interposing spaces between the outer membrane and the inner membrane, fastening the outer ends of said two membranes to the circumference of said heat-insulating floor member, inflating the enclosure formed of said two membranes by applying pressure to the inner room of said enclosure and then filling the intervening space between the two membranes with a foamed member.

4 Claims, 4 Drawing Figures

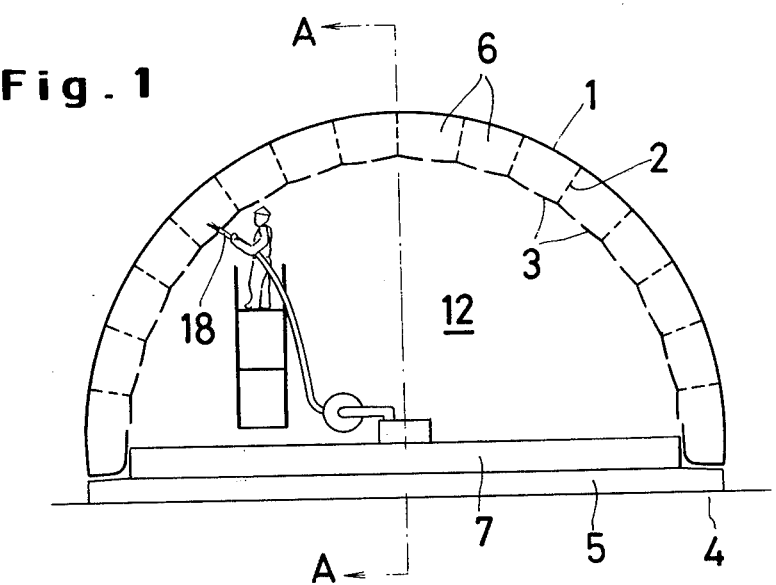
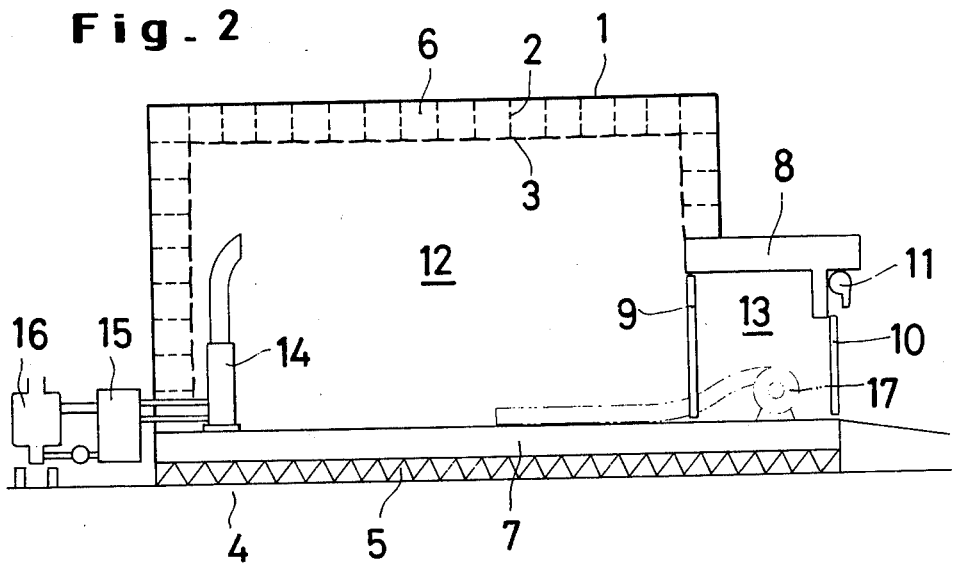

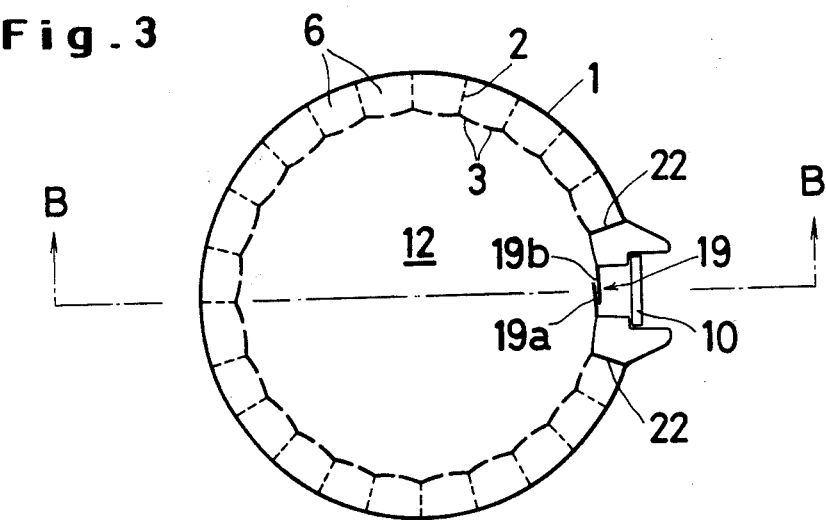
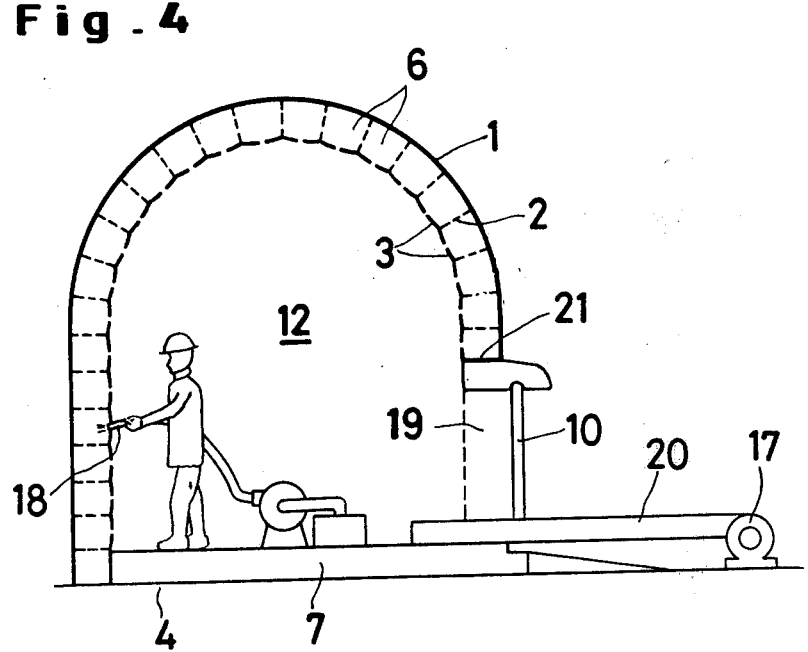

METHOD FOR MANUFACTURING A HEAT-INSULATING CLOSED STRUCTURE

BACKGROUND OF THE INVENTION

This invention relates to a heat-insulating closed structure featuring low cost, high air-tightness and heat-insulating property, light weight and great durability which has a composite membrane unit comprising an outer membrane formed of a gas-impervious substance, an inner membrane disposed at a distance from said outer membrane and formed with either a gas-impervious membrane having small holes punched therethrough at fixed intervals or a membrane of gas-pervious texture and a foamed heat-insulating member interposed to fill the space between said two membrane. The present invention relates further to a method for the manufacture of said heat-insulating closed structure.

With the advance achieved in recent years in techniques for the formation of foamed products, the method which enables structures to be built directly by foam molding has reached the point of being widely practiced. Consequently it has now become possible to build a structure by effecting foam molding at a desired building site. The foaming substance to be used in this foam molding can be selected from a rich variety of foaming compositions. Particularly in the case of urethane resins, foamed products of varying properties have become obtainable in consequence of the progress attained in research and development. Moreover, urethane resins enjoy the advantage of being moldable under a wide range of foaming conditions.

One shortcoming of the conventional method for foam molding large structures at building sites has been its susceptibility to weather conditions. In addition, it has been pointed out that the techniques conventionally employed in foam molding entail various problems such as are described herein below.

As the means for forming foamed products, there have heretofore been adopted the mold process which uses no molding dies and the spray process which uses no molding dies.

In effecting foam molding by the mold process, there is required a retaining device strong enough to withstand the pressure of foaming. This retaining device becomes voluminous and expensive when the foamed products have particularly large dimensions.

As a typical example of this kind of foam molding heretofore practiced, there may be cited a process which comprises erecting a form conforming to a desired structure. by suitably assembling panels made of wood, metal or synthetic resin, casting a foaming dope into the spacer enclosed by said panels, thereafter causing said dope to foam and allowing the foam to set.

A heat-insulating structure which uses heat-insulating panels having foamed urethane slabs coated with metal sheets has already been adopted for use in combination freezer-refrigerators. A constantly recurring complaint about such refrigerators is, however, that they are expensive and that they fail to provide desired heat-insulation at areas where such component panels are joined. An attempt to manufacture larger panels with a view to decreasing such joint areas inevitably requires a marked addition to the dimensions of the production facilities and consequently boosts the cost of equipment. In this case, there ensue other problems such as, for example, the selection of the position for an inlet through which the foaming dope is introduced into the cavity of the form, the displacement of air with the foaming dope particularly in a form of complicated design, and the difficulty experienced in ensuring uniform distribution of the foaming dope throughout the cavity of the form.

While the technical difficulties described above are encountered, the major disadvantages suffered in effecting the process in actuality are as follows:

(1). Lack of uniform distribution of foaming dope.
(2 ). Occurence of large voids due to residue of air bubbles.
(3). Unpredictable deformation due to secondary foaming.

When a large structure is built by use of urethane foam, voids occur in the structure interior and these voids may possibly lead to surface decays and to structure deformation, permitting development of dangerous and serious cracks. This phenomenon is frequently observed. These voids and the cracks which develop from such voids constitute the most fatal flaw for foamed products.

These voids may be ascribed to various causes. For example, since the form conforming to the desired structure is obtained by assembling component panels, there is a possibility that portions susceptible to stagnation of air may occur within the cavity enclosed with the panels. It is also possible that frictional force is generated between the inner wall surface of the form and the adhering bubbles of the foam while the foaming dope is being poured into the form or it is undergoing solidification, with the result that the formed bubbles are deformed or merge to give rise to large voids.

To preclude such problems, it is necessary that due consideration be paid to heightening the degree of surface finish of the inner walls of the form and also giving the form a shape containing the fewest possible corners. In addition, various improvements have been tried with respect to the shape and dimensions of nozzles used for the introduction of foaming dope. It is, however, difficult to fix a definite set of standards in this respect. The object of preventing formation of voids may be attained to some extent by, for example, providing the form with a multiplicity of inlets for introducing the foaming dope into the form cavity. This work, however, requires much labor.

The spray process developed for foam molding is an excellent way of manufacturing foamed products on the spot. It enables a structure of any desired shape to be built or produced with a foamed substance at the site of building by using a foaming dope of rigid urethane. According to this process, however, the urethane resin is apt fly around the form to degrade the yield of work and, what is more, defile the environment. The foamed product has an extremely rough surface and, therefore, entails much labor for surface finishing. When such work is performed outdooors, the surface of the foamed product which is sprayed must subsequently be coated so as to avoid possible effects of weather and particularly to prevent penetration of humidity. For this purpose, the work of covering the foamed product with a sheet of material impervious to water and humidity or coating the foamed product with a similar protective film is required to follow the step of spraying. It is not an easy job to drape a large structure on all of its outer faces with a covering material especially when the work must be done outdoors. This work necessitates use of large scaffoldings and a hoisting machine and requires highly-skilled labor. For a sheet-shaped cover to provide required protection for the foamed product from humidity, the edges of said cover must be handled with particular care lest they should develop leaks to water or humidity. Perfect protection of the sprayed foamed product from water or humidity cannot be obtained by simply having said product draped with a sheet material. The ends of such sheet material placed to drape the foamed product are loose enough to admit rain water or other similar liquid. It is well known that prevention of invasion by humidity is particularly difficult. Once humidity begins to find access to the inside of the cover, it converts itself into vapor and the vapor diffuses into the individual cells and fine crevices in the foamed product. When this foamed product is used in a freezer or freezing facility, the vapor trapped therein is condensed and frozen to the extent of having an adverse effect upon the thermal behavior of the gas cells. The freezing of the condensed vapor can, in the worst case, fracture the individual cells in the foamed product.

A principal object of this invention is to provide a heat-insulating closed structure which is simple to build, permits necesssary handling outdoors as well as indoors and excels in heat-insulating property.

Another object of the present invention is to provide a method for the manufacture of a heat-insulating closed structure which is simple to build, permits necessary handling outdoors as well as indoors and excels in heat-insulating property.

SUMMARY OF THE INVENTION

To accomplish the objects described above, the heat-insulating closed structure according to the present invention is possessed of a composite membrane unit which comprises an inner membrane formed with a gas-impervious membrane having small holes punched therethrough at appropriate intervals or an inner membrane formed with a membrane of gas-pervious texture, an outer membrane disposed at a distance from said inner membrane and formed of a gas-impervious substance and a foamed member placed to fill the space intervening between said inner membrane and outer membrane. As to the type of the heat-insulating closed structure, a type having the composite membrane unit disposed semicylindrically on a heat-insulating floor member, a type having disposed on the heat-insulating floor member the composite membrane unit in the shape of an erect cylinder containing a dome at the top, a type having the composite membrane unit formed of itself in the shape of a sphere, a partially truncated sphere, a cylinder or other similar figure, a type combining said shapes with one another and a type combining one of said shapes with a flat composite membrane unit are all embraced by the present invention.

To obtain the heat-insulating closed structure according to this invention, the inner membrane is disposed by the medium of spacers on the inside of the outer membrane and pressure is exerted on the outer face of the inner membrane with a forced flow of gas. Since the inner membrane is of a gas-pervious texture, the forced flow of gas penetrates through the inner membrane and consequently acts to inflate the outer membrane. Subsequently, the foaming dope is introduced from the inside of the inner membrane into the cavity formed between the outer membrane and the inner membrane and said foaming dope is caused to foam to fill the cavity with a foamed product and give birth to said composite membrane unit.

The other characteristic features and advantages of the present invention will become apparent from the description to be given in further detail with reference to the accompanying drawing.

BRIEF EXPLANATION OF THE DRAWING

FIG. 1 is a longitudinal cross section of a model designed to aid in describing one preferred embodiment of the heat-insulating closed structure and the method for manufacture thereof according to the present invention.

FIG. 2 is a cross-sectional view taken along the line A—A in FIG. 1.

FIG. 3 is a plan view of a model designed to illustrate another preferred embodiment of the present invention.

FIG. 4 is a cross-sectional view taken along the line B—B of FIG. 3.

DETAILED DESCRIPTION OF THE INVENTION

The present invention will first be described with reference to FIG. 1 and FIG. 2 which illustrate one preferred embodiment of the invention. The heat-insulating closed structure illustrated in FIG. 1 has its axis in the horizontal direction. It is a semicylindrical structure containing a frontal compartment in one of the vertical gable sides and is possessed of a composite membrane unit comprising an outer membrane formed of a gas-impervious substance, an inner membrane formed with a gas-impervious membrane having small holes punched therethrough at suitable intervals and/or an inner membrane formed of a gas-pervious substance or substance of texture pervious to gas, and a foamed member placed to fill the cavity intervening between said membranes. FIG. 1 is a cross-sectional view of a model and FIG. 2 is a cross-sectional view taken along the line A—A of FIG. 1. In the diagrams 1 denotes an outer membrane formed of a gas-impervious substance and 3 an inner membrane and these membranes 1 and 3 are separated by a prescribed interval from each other by means of spacers 2. The inner membrane 3 is formed of a membrane of gas-pervious woven fabric or a gas-impervious membrane having small holes punched therethrough, so that it will have a texture pervious to gases. On the ground surface 4, a galvanized steel sheet 5 containing V corrugations is laid to underlie a floor member 7.

A foamed member 6 is placed to fill up the cavity between the inner and outer membranes. The floor member 7 is also formed of a heat-insulating substance. Denoted by 8 is a roof of heat-insulating material for said frontal compartment, by 9 an inner door, by 10 an insulation door and by 11 device for blowing air to form an air curtain over said insulation door 10. The V-corrugated galvanized steel sheet 5 and the floor member 7 constitute the bottom of said frontal compartment, while a heat-insulating wall formed of a heat-insulating material encloses said frontal compartment. The numerals 12 and 13 denote the main room of the structure and the interior of the frontal compartment respectively and the numerals 14, 15 and 16 denote a chiller unit, a refrigerator and a cooling tower respectively. These units are installed when, for example the interior of the structure is to be cooled for use as a cold storage compartment.

Now the method for manufacturing the structure illustrated in FIG. 1 and FIG. 2 will be described.

The composite membrane is first produced by disposing a gas-pervious inner membrane 3 by the medium of spacers 2 on the inside of an outer membrane 1 formed of a gas-impervious substance. The spacers 2 are required to be disposed at appropriate intervals so as to keep the inner membrane and the outer membrane at a constant distance from each other. The number and size of these spacers are determined by the size of the structure, the strength of the foamed member, the foam pressure, the thermal conductivity, etc.

The inner membrane is required to have a gas-pervious texture and, therefore, is formed with a membrane of gas-pervious woven fabric or a gas-impervious membrane having small holes punched therethrough at suitable intervals. It is also required to possess strength enough to withstand the foam pressure. The shape of the inner membrane is required to be such that, when the composite membrane is inflated and made to stand up on its own as described hereinbelow, it will be stretched at a uniform distance from the inside of the outer member. The composite membrane must be assembled in such way that, when it is exposed to the foam pressure, the two membranes, the spacers and their joints exhibit strength enough to overcome said pressure. In this preferred embodiment, one of the two gable sides thereof is closed with an extended portion of said composite membrane unit and the remaining gable side accomodates a frontal compartment 13. This frontal compartment comprises a roof member 8, heat-insulating walls formed of a heat-insulating substance and an insulation door 10 installed so as to permit communication between the outside and the structure interior. Inside the frontal compartment, there is installed a provisional partition made of plywood and adapted to slide in the horizontal direction.

On the level ground surface 4, the V-corrugated galvanized steel sheet 5 is laid and the heat-insulating floor member 7 is laid out on said steel sheet so as not to expose to sight any part of the underlying steel sheet. The galvanized steel sheet is required to be laid in such way that its corrugations fall perpendicularly relative to the axial direction of the composite membrane unit which will be described afterward. It is also important that this galvanized steel sheet have strength enough to amply withstand the bending moment originating in the tension which is produced at the ends of membranes during the inflation of said membranes.

Subsequently, said composite membrane is fastened to the floor member. This fastening is accomplished by joining the lower edges of the composite membrane to the edges of said galvanized steel sheet without permitting any gap to occur between said sheet and the heat-insulating floor member laid thereon. In forming a membrane structure by applying inflating pressure to the interior room of the inclosure, it is easier to form a curved surface than a flat surface. In the sample shown in FIG. 1 and FIG. 2, the arched steel frames would not be necessary if each of the vertical gable sides were replaced by two ¼ spheres. The disadvantage of such a structure would be the increase in dead (unusable) space.

The method for enabling this composite membrane to stand up on its own will be described. The self-standing of the composite membrane is accomplished by inflating the composite membrane by introducing therein a compressed gas. With the embodiment of FIG. 1 and FIG. 2, this method is effected by placing a blower 17 in advance inside the frontal compartment and then introducing a forced flow of air, for example, past the provisional partition. Prior to the introduction of the forced flow of air, wires are attached to the arched steel frames. As the compressed air is introduced into the space enclosed with the composite membrane, it finds its way through the inner membrane and consequently inflates the outer membrane. At this time, the wires attached to the arched steel frames are pulled until said frames stand up vertically and then the wires are held in that position by having their respective free ends fastened. It is desirable that the two frames be immobilized by having a wire stretched taut therebetween. Where circumstances permit, the frames and wires may be removed after the structure has been completed. Thereafter, an injection nozzle 18 is stuck into the cavity behind the inner membrane from within the composite membrane and a foaming dope of, say, urethane resin, is introduced via the nozzle. The foaming dope provided to fill the cavity in the composite membrane is caused to foam and the foam thus produced is allowed to set. Due precautions should be exercised so that the foaming should not occur unevenly. The preferred embodiment so far described incorporates a frontal compartment. In the finally obtained structure, an inner door 9 is disposed between the frontal compartment 13 and the main room 12. Said inner door may be installed from the beginning. It may otherwise be put in position after the structure has been made to stand up on its own and the provisional partition has been removed.

Where the composite membrane is not desired to bulge out excessively because of the pressure applied outwardly from within for the purpose of inflation, several posts disposed in advance between the V-corrugated galvanized steel sheet and the arched steel frame will effectively preclude otherwise possible excessive bulging.

The foaming in the cavity of the composite membrane in the case of the preferred embodiment illustrated in FIG. 1 and FIG. 2, for example, can be effected smoothly by first allowing the foaming to occur in the portion of the structure to the exclusion of the gable portions and subsequently allowing it to occur in the gable portions.

To ensure heat insulation of the structure, it is important that all the gaps occurring between the composite membrane and the floor member, for example, should be eliminated thoroughly by filling said gaps with the foaming dope and allowing the dope to foam and close up the gaps.

The corrugations in the galvanized steel sheet to be laid under the floor member may have a cross section of the shape of two sides of a triangle, the shape of three sides of a square or some other suitable shape. The material of this sheet may be a weatherable steel. If the period of use is short, it may be steel of the grade for ordinary structure. Besides, stainless steel, aluminum or other suitable material may be used. Generally, any sheet may be used in so far as it is corrugated.

The external surface of the outer membrane may be covered with some other coat such as a polyethylene cloth having an aluminum foil laminated therewith or an aluminum layer vacuum deposited thereon, so as to be shielded more effectively from the sunlight. The durability of the heat-insulating closed structure of the present invention can be enhanced by replacing this cloth with a new supply at intervals of several years.

Typical physical properties of the foamed member of urethane resin are as follows:

Bulk density : 0.03 ~ 0.04

Thermal conductivity : 0.02 ~ 0.03 Kcal/hr.m.° C

Besides urethane resin, raw materials which are usable for the foaming dope include resins such as phenol resin and urea resin and inorganic foaming liquids such as foaming cement.

FIG. 3 is a plan view of a model designed to illustrate another prefered embodiment of the present invention and FIG. 4 is a cross-sectional view taken along the line B—B of FIG. 3

This embodiment is devoid of a frontal compartment and is possessed of a composite membrane unit of a shape comprising a cylindrical base the axis of which falls in a vertical direction and a hemispherical top rising from the upper end of said cylindrical base. In the diagram, 4 denotes ground level, 1 an outer membrane, 3 an inner membrane and 2 spacers respectively. This embodiment is additionally provided with a provisional entrance 19. When this structure is brought to its self-standing position, a duct 20 made of duck such as for use in canvas is inserted between the two provisional membranes 19a and 19b placed at said provisional entrance 19 and the forced flow of a gas from a blower 17 is introduced to exert pressure outwardly to the composite membrane from within. In the finally produced structure, an insulation door 10 is installed to take the place of this provisional door 19. In anticipation of this installation, spacers are disposed adjoiningly along the upper side 21 and the lateral sides 22 of said provisional entrance 19 in advance. When the foaming in the cavity of the composite has been completed, the insulation door 10 is set in position by having the spacers readjusted in shape and position so as to conform to the door. Subsequently the foaming dope is injected into the door cavity and the dope thus placed in position is allowed to foam and set. In this manner, the structure can be provided with an insulation door which is extremely strong and highly efficient in heat insulation.

Where the heat-insulating closed structure contemplated by the present invention has no need for either the insulation door or the frontal compartment but is only required to comprise an inner membrane, an outer membrane, a foamed member placed to intervene between said two membranes and a floor member, the manufacture thereof can satisfactorily be accomplished by allowing a provisional door formed of provisional membranes 19a and 19b such as is indicated in Example 2 to be attached to one part of the composite membrane and, after the structure has been made to stand up on its own, having the provisional door replaced with required membranes and a foamed member.

According to the method described above, the foaming dope can be freely introduced to any desired position in the cavity formed between the outer and inner membranes. If a transparent or translucent gas-pervious membrane or a transparent or translucent gas-impervious membrane fabricated so as to contain a multiplicity of small inlets is used as the inner membrane, the air in the cavity is easily displaced by the incoming foaming dope and the excess air cells are efficiently released in the course of foaming. Consequently, formation of voids and heavy cracks as mentioned in the description of the conventional mold process can be avoided. Particularly the transparent or translucent inner membrane enables the operator to keep a watch on the changing interior condition of the cavity and accordingly regulate the introduction of the foaming dope, so that cracks occurring deep inside cannot escape detection. If the inner membrane has an excessively coarsely woven texture, the urethane resin may leak therethrough while it is foaming. It is, therefore, desirable that the inner membrane be of a texture woven to the finest possible extent within which the membrane is permitted to enjoy gas-perviousness. In the case of an inner membrane which is formed with a gas-impervious membrane having inlets for injection of the urethane foaming dope punched therethrough at suitable intervals, it is desired that the membrane be of a design such that said inlets are immediately closed when the injection of the foaming dope is completed. This closure of the inlets may be accomplished by applying adhesive tape over their openings.

The foaming dope utilized to fill the cavity formed between the inner and outer membranes foams and expands, shortly undergoes gelation, acquires viscosity and elasticity and eventually retains some pressing force. From this point on, the polymerization reaction accompanied by effervescence proceeds under a compressed condition and permits the foamed product to expand into all parts and corners of the cavity. Frequently, Freon, which is a readily volatile substance is used as an assistant foaming agent.

Owing to the foaming which proceeds under a compressed state, the outer surface portion, particularly the surface portion of the foamed member which is held in direct contact with the inner surface of the outer gas-impervious membrane, is pressed against the outer membrane and consequently compacted in texture by virtue of the pressure exerted from within the foamed member. The compacted portion of the foamed member constitutes itself a surface skin having increased apparent density and strength. This surface skin portion serves, in much the same way as an outer shell, to enhance the retaining strength of the foamed member and at the same time protect the interior portion of the foamed member from humidity and prevent the foamed member itself from possible influences of changes of ambient air conditions. It further serves the purpose of protecting the interior of the foamed member from influences of ultraviolet rays and from chemical activities of pollutants in the air.

Owing to the intervention of the foamed member, the assembly comprisng the outer member, the spacers and the inner membrane can be converted into a strong unitary shell unit which can serve as a structure excelling in mechanical strength. This unitary structure enjoys much higher strength that the foamed member produced by itself.

The method according to the present invention, therefore, obviates necessity for giving to the surfaces of the membranes a chemical or physical treatment so as to smoothen the flow of the foaming dope on said surfaces and enhance the adhesion of the foamed member to the surfaces.

On-the-spot foam moldng is impeded by rain or snow. Further, when the structure desired has great dimensions, there can occur a large variation in the work environment such as when part of the structure is exposed to possible influences of the direct incidence of sunlight and the remaining part thereof is free from such influences. In the case of the method according to this invention, such disadvantages of the on-the-spot foam molding are eliminated because the work is to be performed within the space enclosed with the outer membrane which has been inflated and consequently made to stand up on its own in advance. In other words, the work can be carried out in accordance with a schedule substantially identical with one which would be used for molding work performed in a plant.

Also the fact that a large volume of outer air is fed by a blower for the purpose of increasing the internal pressure in the space enclosed with the composite membrane brings about an advantage of maintaining the work environment in favorable conditions since the air serves to dilute the Freon gas generated in the course of foaming and sufficiently ventilate the interior air with the outer air.

The structure to be obtained by the method of the present invention enjoys high reliability as described above. Insofar as the dimensions are within certain limits, the shell structure of this invention, therefore, can satisfactorily be used in its unmodified form without requiring use of skeletal members such as those in the Rahmen (rigid frame) structure. Moreover, this structure provides outstanding protection against possible invasion of humidity and heat. Since the foam member intended as the heat insulator is distributed to all parts and corners in an uninterrupted state to give rise to a uniform heat-insulating layer, the structure is free from the possible phenomenon of freezing when it is used as a combination freezer and refrigerator. Since this structure has a very low heat load, desired freezing and refrigerating within the space enclosed therewith can be attained by use of a small freezer.

Where the heat-insulating closed structure of this invention is desired to be built in particularly large dimensions, it is necessary to have the outer surface of the structure suspended at a required number of points from a separate structure. Also in this case, the structure is given excellent heat-insulating capacity by having the outer membrane suspended at a required number of points from said separate structure, applying pressure to the space enclosed with the composite membrane outwardly from within, injecting the foaming dope into the cavity formed between the two membranes and allowing said foaming dope to foam and set.

Now, the heat-insulating closed structure manufactured by the method of this invention will be described more specifically herein below with reference to preferred embodiments.

EXAMPLE 1

A heat-insulating closed structure of a design illustrated in FIG. 1 (with the exception of the frontal compartment) and possessing the following particulars was manufactured.

| Dimensions of structure | |
|---|---|
| Floor area | 8m × 8m |
| Maximum height | About 4m |
| Outer diameter | About 8m |
| Height and width of spacers | 18cm × 18cm |
| Clearance between spacers | 18cm |

Description of component parts

Outer membrane 1 — Polyamide cloth coated with vinyl chloride and possessed of tensile strength of 120 kg/3cm Inner membrane 3 — Polyethylene cloth using 1000-denier filaments at a weave density of $7 \times 7/\text{inch}^2$.

Spacer 2 — Same cloth as used in the outer membrane.

Floor member 6 — Upper layer of waterproofed plywood 15mm in thickness, intervening layer of foam polystyrene 180mm in thickness, and lower layer of waterproofed plywood 9mm in thickness.

Foundation 5 — V-corrugated galvanized iron sheet 1.6mm in thickness and 75mm depth of corrugations.

The structure thus manufactured exhibited excellent heat-insulating property and proved to be suitable for use as a freezing storage.

EXAMPLE 2

A heat-insulating closed structure of the design illustrated in FIG. 3 was manufactured.

| Dimensions of structure | |
|---|---|
| Outside diameter | 4m |
| Height and width of spacers | 10cm × 10cm |
| Clearance between spacers | 10cm |
| Maximum height of structure | 4m |

Description of component parts

Outer membrane — Nylon cloth coated with vinyl chloride 40 kg/3cm in tensile strength and 0.65mm in thickness.

Inner membrane —m Same material as the outer membrane.

Floor member — Upper layer of waterproofed plywood 12mm in thickness, intervening layer of foamed polystyrene 135 mm in thickness and lower layer of water-proofed plywood 9mm in thickness.

The heat-insulating closed structure thus manufactured exhibited excellent heat-insulating property and proved to be suitable for use as a freezing storage.

What is claimed is :

1. A method for the manufacture of a heat-insulating closed structure, which comprises the steps of:

forming a composite membrane having an inner membrane, which is formed of a gas-impervious and transparent substance having small holes at appropriate intervals thereof, disposed a distance from the inside of an outer membrane, which is formed of a gas impervious substance, through the medium of spacers;

fastening said composite membrane to a heat-insulating floor member in an edge-to-edge manner;

applying pressure to the space enclosed by said composite membrane and said heat-insulating floor member for thereby inflating the composite membrane and allowing it to stand up on its own;

injecting a foaming dope into the cavity defined between the inner membrane and the outer membrane from the interior of said structure and through said small holes of said inner membrane;

allowing the foaming dope to foam and set, whereby the use of said transparent inner membrane facilitates the monitoring of said injection of said dope from the interior of said structure.

2. The method according to claim 1, further comprising: fabricating said inner membrane of nylon cloth coated with vinyl chloride.

3. A method for the manufacture of a heat-insulating closed structure, which comprises the steps of:

forming a composite membrane having an inner membrane, which is formed of a gas-pervious and transparent woven fabric, disposed a distance from the inside of an outer membrane, which is formed of a gas-impervious substance, through the medium of spacers;

fastening said composite membrane to a heat-insulating floor member in an edge-to-edge manner;

applying pressure to the space enclosed by said composite membrane and said heat-insulating floor member for thereby inflating the composite membrane and allowing it to stand up on its own;

injecting a foaming dope into the cavity defined between the inner membrane and the outer membrane from the interior side of said structure and through the inner membrane; and whereby the use of said transparent inner membrane facilitates the monitoring of said injection of said dope from the interior of said structure.

4. The method according to claim 3, further comprising: fabricating said inner membrane of polyethylene cloth.

* * * * *